United States Patent [19]

Grolitzer

[11] Patent Number: 4,528,106
[45] Date of Patent: Jul. 9, 1985

[54] GLUCOSIDE SURFACTANTS

[75] Inventor: Marilyn A. Grolitzer, Hamden, Conn.

[73] Assignee: Olin Corporation, Cheshire, Conn.

[21] Appl. No.: 551,537

[22] Filed: Nov. 14, 1983

[51] Int. Cl.$^3$ .............................................. C09K 3/00
[52] U.S. Cl. ............................... 252/8.55 D; 252/329; 166/275; 536/4.1
[58] Field of Search .......... 252/321, 328, 329, 8.55 D, 252/314, 358, 156, 173, 174.17, 174.18, 174.21, DIG. 1, DIG. 14, 8.55 R; 166/275; 536/4.1

[56] References Cited

U.S. PATENT DOCUMENTS

| | | | |
|---|---|---|---|
| 3,640,998 | 2/1972 | Mansfield et al. | 260/210 R |
| 4,225,456 | 4/1980 | Schmidt et al. | 252/321 |
| 4,240,921 | 12/1980 | Kaniecki | 252/321 |
| 4,264,478 | 4/1981 | Seldner | 252/522 R |
| 4,371,444 | 2/1983 | McCoy et al. | 252/8.55 D |

OTHER PUBLICATIONS

Amerchol Corporation product brochure for GLU-CAM ® E-10, E-20, P-10 and P-20 alkoxylated glucose derivatives.

Primary Examiner—Edward A. Miller
Assistant Examiner—T. J. Wallen
Attorney, Agent, or Firm—William A. Simons; Thomas P. O'day

[57] ABSTRACT

Nonionic polyalkoxylated glucoside surfactant compositions useful in forming stable emulsions with oil in saline solutions comprising:

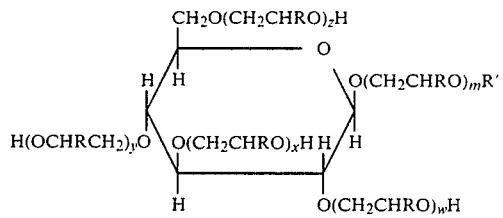

wherein each R is individually selected from the group consisting of a hydrogen and a methyl group; wherein the sum of $w+x+y+z$ is from about 4 to about 40; and wherein m is from about 2 to about 15; and wherein R' is selected from the group consisting of an alkyl group having about 6 to about 20 carbon atoms, an alkenyl group having about 6 to about 20 carbon atoms and an alkyl aryl group having about 10 to about 20 carbon atoms.

These surfactant compositions are made by reacting the corresponding alkoxylated lower alkyl glucoside with a hydrophobic alkoxylated alcohol by means of an alcohol interchange reaction (transacetalation). These surfactant compositions may be employed in enhanced oil recovery processes and other applications where good emulsification and high salinity tolerances are required, such as textiles, leather, dairy, concrete grinding aids and drilling muds.

12 Claims, No Drawings

GLUCOSIDE SURFACTANTS

BACKGROUND OF THE INVENTION

1. Field of the Invention

The present invention relates to a process for making selected polyalkoxylated glucosides. Furthermore, the present invention also relates to polyalkoxylated glucosides as prepared by this process and their use as surfactants in enhanced oil recovery processes.

2. Brief Description of the Prior Art

Surfactants are commonly used agents employed in a wide variety of commercial processes and products. In the field of enhanced oil recovery, both anionic and nonionic surfactants are being employed. See U.S. Pat. No. 4,371,444, which issued to McCoy and Naylor on Feb. 1, 1983 and is incorporated herein by reference in its entirety.

Surfactants used in enhanced oil recovery applications are required to have certain properties. First, they should reduce the interfacial tension values between the crude oil and the aqueous drive fluid used for recovery, thereby causing good emulsification of the crude oil in the drive fluid. Second, they should stay soluble at the high temperatures sometimes experienced in the oil-bearing rock formations. Third, they should remain stable and effective even in the presence of high ionic strength materials (e.g. monovalent ions such as $Na^+$, $Cl^-$ and $OH^-$ and divalent ions such as $Ca^{++}$ and $Mg^{++}$) which may also be present during operations. Fourth, the cost of these surfactants should be low enough to justify recovery of the additional oil.

While there are surfactants that meet these requirements under certain operating conditions, there is a strong need for surfactants which are effective over wider or different ranges of operating conditions, particularly at high salinities and high temperatures.

Glucoside-based surfactants have a high tolerance to strong ionic strength solutions as well as having good solubility in aqueous solutions. These characteristics are due at least in part to their multi-hydroxyl functionality.

U.S. Pat. No. 3,640,998, which issued to Mansfield and Rainey on Feb. 8, 1972, teaches the preparation of surface active compositions comprising mixtures of alkylene oxide adducts of alkyl oligosaccharides, alkyl glucosides and alkanols. These surface active compositions are made by (1) preparing a mixture of lower alkyl oligosaccharides and a lower alkyl glucoside by a conventional Fischer-type reaction of one mole of glucose with 1 to 12 moles of a lower alkanol; (2) then replacing the lower alkyl groups with higher primary alcohol groups ($C_8$ to $C_{32}$) by means of an alcohol interchange reaction (transacetalation); followed by (c) introducing lower alkylene oxide groups onto the components of the group.

This disclosed synthesis has several significant limitations. First, a mixture of several compounds is made instead of one product or primarily one product. In fact, the patent teaches the relative amounts of the formed alcohol, alkyl glucoside and alkyl oligosaccharide components are determined by the mole ratio of alcohol/glucose and the extent of the transacetalation reaction (See column 3, lines 13-20 and lines 51-58 of the patent). Also, the attachment of the long hydrocarbon chain moiety requires two addition stages and the interchange of alcohols. These steps may lead to the decomposition of the glucoside moiety or the formation of unwanted by-products or both. Still further, the synthesis is limited to placing only saturated aliphatic hydrocarbon radicals ranging from $C_8H_{17}$ to $C_{32}H_{65}$ by the alcohol interchange reaction. The synthesis does not provide for the introduction of unsaturated or aryl groups as part of alcohol.

BRIEF SUMMARY OF THE INVENTION

The present invention is directed to a process for preparing a polyalkoxylated glucoside having the formula (I):

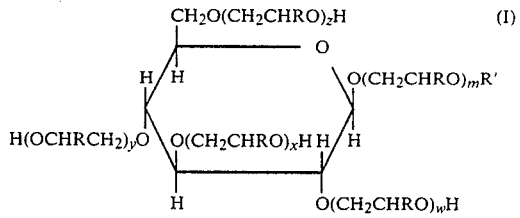

wherein each R is individually selected from the group consisting of a hydrogen and a methyl group; wherein the sum of $w+x+y+z$ is from about 4 to about 40; and wherein m is from about 2 to about 15; and wherein R' is selected from the group consisting of an alkyl group having about 6 to about 20 carbon atoms, an alkenyl group having about 6 to about 20 carbon atoms and an alkyl aryl group having about 10 to about 20 carbon atoms; said process comprising:

reacting in the presence of an effective catalytic amount of acid catalyst and at a temperature from about 100° C. to about 150° C. a polyalkoxylated lower alkyl glucoside of the formula:

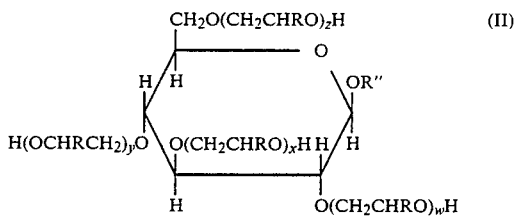

wherein R, w, x, y and z are as defined above and R" is a lower alkyl group having 1 to 4 carbon atoms with a polyalkoxylated alcohol of the formula

$$HO-(CH_2CHRO)_m-R' \qquad (III)$$

wherein R and R' are as defined above.

Further, the present invention is also directed to, as compositions of matter, these selected polyalkoxylated glucoside compositions of formula (I).

Still further, the present invention is also directed to a process for recovering hydrocarbons from a subterranean hydrocarbon-bearing formation penetrated by at least one injection well and at least one production well which comprises the steps of:

(1) injecting into the formation via an injection well a drive fluid comprising water having dissolved therein from about 0.05 to about 6.0 weight percent of a surfactant composition comprising a polyalkoxylated glucoside of formula (I), above;

(2) forcing the fluid through the formation; and (3) recovering hydrocarbons through a production well.

DETAILED DESCRIPTION

The polyalkoxylated lower alkyl glucosides of formula (II), above, may be made by reacting the corresponding lower alkyl glucoside with either ethylene oxide (EO) or propylene oxide (PO) or mixtures thereof (either simultaneously or sequentially) under any conventional alkoxylation conditions. Methyl and butyl glucoside are the preferred lower alkyl glucosides because of their wide availability. Methyl glucoside is the most preferred precursor because of the ease of removing methanol in the alcohol interchange reaction of the present invention. It should be noted that the present invention includes the use of alpha and beta methyl glucosides as well as mixtures thereof.

A typical method used to prepare these polyalkoxylated lower alkyl glucosides is to react ethylene oxide or propylene oxide or both with methyl glucoside in the presence of an alkaline catalyst (such as potassium hydroxide) at a temperature from about 140° C. to about 160° C. and at an elevated pressure. After the reaction is complete, the alkaline catalyst is neutralized with an acid. This preparation is further discussed in U.S. Pat. No. 4,264,478 which issued to Seldner on Apr. 28, 1981 and is incorporated herein by reference in its entirety.

Polyalkoxylated methyl glucoside compounds are commercially available from Amerchol Corporation, Talmadge Road, Edison, N.J. under the trademark GLUCAM® methyl glucoside polyol. GLUCAM® E-10 and GLUCAM® E-20 are the 10 and 20 mole ethoxylates respectively. GLUCAM® P-10 and GLUCAM® P-20 are the 10 and 20 mole propoxylates, respectively. For example, GLUCAM® P-20 is prepared by reacting 20 moles of propylene oxide (PO) with 1 mole of methyl glucoside. Thus, the average number of PO groups on each methyl glucoside molecule in that case will be 20. However, it should be understood that the number of moles of EO or PO reacted to each particular lower alkyl glucoside molecule will not necessarily be the same. It will be a statistical distribution. Therefore, the sum of w, x, y and z as defined in Formula (I) and (II), above, represent the average number of EO or PO units per glucoside molecule and the actual number may be less or greater than that sum. Thus, the preferred sum of w+x+y+z for the present invention is from about 10 to about 20.

The alkoxylated alcohol starting materials of the process of the present invention, as defined in formula (III), above, include commercially available chemicals which may be obtained from many sources. The preferred alkoxylated alcohols for the process of the present invention include ethoxylated alkyl alcohols wherein m is from about 2 to about 10 and R' is an alkyl group from 8 to 13 carbon atoms as defined in formula (III), above. Other preferred alkoxylated alcohols include ethoxylated alkyl phenols wherein m is from about 5 to about 10 and R' is an alkyl aryl group having from about 14 to about 18 carbon atoms. Most preferred alkoxylated alcohols are ethoxylated nonyl phenols wherein m is from about 6 to about 9 and R' is 15.

Suitable alkoxylated alkyl alcohols include NEODOL® 91-2.5, NEODOL® 91-6 and NEODOL® 91-8 ethoxylated alcohols sold by Shell Chemical Company of Houston, Tex. Suitable alkoxylated alkyl phenols include the POLY-TERGENT® series ethoxylated nonyl phenol surfactants sold by Olin Corporation of Stamford. Conn.

The mole ratio of the two reactants is not critical to the present invention and the optimum mole ratio will depend upon the specific reactants used. Preferably, it is preferred to employ a mole ratio of polyalkoxylated lower alkyl glucoside to polyalkoxylated alcohol in the range from about 0.80:1 to about 1.2:1. More preferably, this mole ratio is in the range from about 0.95:1 to about 1.05:1.

The reaction of the polyalkoxylated lower alkyl glucoside and the polyalkoxylated alcohol must take place in the presence of an acid catalyst. The preferred acid catalyst is boron trifluoride etherate because of its ease of use and smaller amounts of decomposition by-products being formed. Other acid catalysts such as sulfuric acid, methane sulfonic acid and the like may be used. Overall, both protic and Lewis acid catalysts will effect this reaction. The amount of acid catalyst used depends upon the nature of the catalyst and the nature of the reactants employed.

Other reaction conditions except temperature are not critical to the present invention. As stated above, reaction temperature from about 100° C. to 150° C. are needed for the reaction to proceed at a desirable rate. Preferably, temperatures from about 110° C. to about 145° C. are desired for this reaction. Both super- and sub-atmospheric reaction pressures may be employed, although atmospheric pressures are preferred. If atmospheric pressure is employed, it may be preferable in some situations to employ a nitrogen atmosphere.

The desired product may be recovered from the reaction mixture by any conventional purification technique and the exact recovery steps and parameters employed are not critical to the present invention. For example, it may be desirable to extract unreacted alkoxylated alcohol from the product with an organic solvent such as hexane or toluene or the like. In other cases, it may be more suitable to distill the unreacted alkoxylated alcohol from the desired product, especially under vacuum.

Also, in accordance with the present invention, it has been found that the compounds of formula (I), above, may be utilized as effective surfactants in enhanced oil recovery applications. For such applications, the surfactant is dissolved in a drive fluid such as water. This drive fluid is injected into a subterranean hydrocarbon-bearing formation to displace hydrocarbons in the formation toward a production well wherefrom the hydrocarbons are recovered. In enhanced oil recovery applications the desired surfactant concentration in an aqueous drive fluid may range from about 0.05 to about 6.0% by weight. More preferably, it may range from about 0.1 to about 4.0% by weight. The optimum concentration will depend upon the particular glucoside surfactant employed.

As supported by the results of the specific Examples below, the surfactant compositions of the present invention are especially suitable for enhanced oil recovery applications because they are relatively insensitive to salinity and pH changes as well as being soluble in relatively high brine solutions and exhibiting good emulsification properties (i.e. having low interfacial tension when employed in oil vs. water combinations).

The drive fluid compositions containing the present surfactant may preferably include other conventional agents employed for such applications. For example, the driving fluid may be saturated with carbon dioxide, nitrogen, natural gases or the like. Furthermore, the drive fluids of this invention may contain, if desired, a water-soluble polymeric thickening agent such as a polyacrylamide or a partially hydrolyzed polyacrylamide. Still further, the drive fluid may include an agent to prevent degradation of the thickening agent by bacterial action. Examples of such agents as well as suitable amounts of these preferred ingredients are disclosed in U.S. Pat. No. 4,371,444, mentioned above. Other conventional drive fluid ingredients may also be included for other preferred embodiments.

While the surfactants of the present invention were developed primarily for use in enhanced oil recovery processes, they may be useful in many other applications which require good emulsification at high salinities. Potential applications include those in industries such as dairy, leather, paint, textiles, drilling muds and concrete grinding aids.

It should also be noted that multi-substituted phenol groups, such as dialkyl phenols and the like are also encompassed within the scope of the present invention and may be substituted for the monoalkyl phenol groups in either adduct.

The following Examples further illustrate the present invention. All parts and percentages employed herein are by weight unless otherwise indicated.

The preparation of surfactants of the present invention is illustrated by the following procedures of Examples 1 and 2.

EXAMPLE 1

In a three neck flask equipped with a stirrer, addition funnel, thermometer and distillation head, a linear $C_9$–$C_{11}$ alcohol-2.5 mole ethoxylate adduct[1] (8.6 grams, 0.03 moles) and $BF_3$ etherate (8 drops) were added. Then, the contents of the flask were heated to 135° C. under a nitrogen atmosphere. Methyl glucoside-20 mole ethoxylate[2] (34.3 grams, 0.032 moles) was added dropwise to the heated flask. After addition was completed, the reaction mixture was heated for 5 hours at 135° C. Upon cooling, the resulting surface active product was extracted with hexane to remove any unreacted alcohol ethoxylate reactant. Next, residual hexane was removed from the product by evaporation. The resulting dried product weighed 30 grams. Aqueous solutions containing 0.1% and 3% by weight of this surface active product were prepared by adding distilled water to the product. These dilute solutions were subjected to various testing procedures to measure the effectiveness of the surfactant product. The results of that testing are given in Table II, below.

[1]NEODOL ® 91-2.5 made by Shell Chemical Company of Houston, Tex.
[2]GLUCAM ® E-20 made by Amerchol Corporation of Edison, N.J.

EXAMPLE 2

In a three neck flask equipped with a stirrer, thermometer and addition funnel and distillation head, a nonyl phenol-6 mole ethoxylate[3] (7.5 grams, 0.015 mole) and $BF_3$ etherate (7 drops) were placed. The contents were heated to 140° C. under a nitrogen atmosphere. Methyl glucoside 20 mole ethoxylate adduct (17.1 grams, 0.016 moles) was added dropwise to the flask. After addition was complete, the reaction mixture was heated for 2 hours at 140° C. Methanol (0.5 grams) was collected from the distillation head of the flask. The product was completely soluble in water and aqueous solutions of 0.1% and 0.3%. Concentrations were prepared by adding distilled water to the product. These dilute solutions were subjected to various testing procedures to measure the effectiveness of their surface active properties. The results are given in Table II.

[3]POLY-TERGENT ® B-200 surfactant made by Olin Corporation of Stamford, Conn.

EXAMPLES 3-8

Various other surfactant products were prepared according to the same general procedure employed in Example 2. The reactants used for making these surfactants are in the following Table I.

TABLE I

| | Surfactant Reactants | |
|---|---|---|
| Example | Nonyl Phenol Ethoxylate (# moles EO) | Methyl Glucoside Alkoxylate (# moles of EO or PO) |
| 3 | 6 | 10 EO |
| 4 | 9 | 10 EO |
| 5 | 9 | 20 EO |
| 6 | 10.5 | 10 EO |
| 7 | 10.5 | 20 EO |
| 8 | 10.5 | 10 PO |

INTERFACIAL TENSION, SURFACE TENSION AND CLOUD POINT CHARACTERISTICS OF SURFACTANT PRODUCTS

The surfactant products of Examples 1-8 were tested for surface active properties. The results of this testing are given in Table II below.

The interfacial and surface tensions of various surfactant concentrations in 100% water solutions vs. mineral oil were measured on a Fisher Autotensiomat Surface Tensiometer using the duNouy Ring method (ASTM Designation D 1331-56). The values given in Table II are uncorrected for the size of the ring, size of the wire used in the ring, and the densities of the two phases. For enhanced oil recovery applications, low interfacial tension (IFT) values are desirable because the lower values indicate better emulsification between the water and oil phases. Generally IFT values vs. mineral oil below 1.0 dyne/cm are looked for in this application.

The cloud point determinations were carried out according to ASTM Designation D 2024-65. For enhanced oil recovery applications, cloud point values above about 70° C. are preferred, but not required, for wide applicability.

TABLE II

| Surfactant Example | Interfacial Tension vs. Mineral Oil at 3% Surfactant Concentration | Surface Tension vs. Mineral Oil at 0.1 Surfactant Concentration | Cloud Point (°C.) |
|---|---|---|---|
| 1 | 4.77 dynes/cm | 34.3 dynes/cm | 100 |
| 2 | 0.63 dynes/cm | 31.2 dynes/cm | 4 |
| 3 | 0.85 dynes/cm | 31.4 dynes/cm | 60-100 |
| 4 | 2.10 dynes/cm | 33.5 dynes/cm | 78 |
| 5 | 2.53 dynes/cm | 36.2 dynes/cm | 100 |
| 6 | 3.22 dynes/cm | 33.7 dynes/cm | 97 |
| 7 | 3.37 dynes/cm | 33.7 dynes/cm | 100 |
| 8 | 3.51 dynes/cm | 32.8 dynes/cm | 62 |

4 no true cloud point measured

INTERFACIAL TENSION CHARACTERISTICS VS. CRUDE OIL WITH EXAMPLE 2 SURFACTANT

The surfactant of Example 2 was tested for surface active properties in various aqueous solutions vs. a napthenic Illinois crude oil using a spinning drop tensiometer [except those indicated with a "+" which are duNouy ring determinations (ASTM D971)].

The Example 2 surfactant product was first dissolved in a simulation of a typical oil field softened fresh water source. The ion concentrations in this simulated oil field water (pH=7.6) is given below:

| Ion | ppm |
|---|---|
| Calcium | 2.0 |
| Magnesium | 1.0 |
| Potassium | 5.0 |
| Sodium | 402.0 |
| Sulfate | 18.0 |
| Chloride | 617.6 |

The interfacial tensions (dynes/cm) were determined between the crude oil and aqueous surfactant solutions containing 0.0, 0.1, 0.5, 1.0 and 3.0% by weight of the Example 2 surfactant product. The results of this testing are given in Table III. It can be seen from Table III that the surfactant product reduces the interfacial tension value with increasing surfactant concentrations.

TABLE III

| | Interfacial Tensions (dynes/cm) vs. Crude Oil At Different Surfactant Concentrations (Wt. %) | | | | |
|---|---|---|---|---|---|
| Surfactant | 0.0% | 0.1% | 0.5% | 1.0% | 3.0% |
| Example 2 | 23.2+ | 6.7 | 2.6 | 0.251 | 0.347 |

The effect on interfacial tension values vs. crude oil by increasing the ionic strength of an aqueous solution containing surfactant product of Example 2 through addition of NaCl was measured. Various amounts of NaCl were added to aqueous solutions containing 3.0% by weight of Example 2. The amount of NaCl added was either 0.0%, 0.1%, 0.3%, 1.0% or 10.0% by weight. The results of this testing are given in Table IV. As can be seen from the results, increasing the ionic strength of this solution resulted in a slight increase in interfacial tension values. But, this slight increase does not bring the interfacial tension values out of an acceptable range for use in enhanced oil recovery processes.

TABLE IV

| | Interfacial Tension (dynes/cm) at 3% Surfactant Conc. in Various NaCl-Containing Aqueous Solutions | | | | |
|---|---|---|---|---|---|
| Surfactant | 0.0% NaCl | 0.1% NaCl | 0.3% NaCl | 1.0% NaCl | 10.0 NaCl |
| Example 2 | 0.251 | 0.510 | 1.1 | 1.3 | 0.9 |

The effect on the interfacial tension values vs. crude oil by raising the surfactant solution pH to 9.0, 10.5 and 12.0 from a initial pH of 3.4 was also measured. Various amounts of an aqueous NaOH solution were added dropwise into an aqueous solution containing 3% by weight of the surfactant of Example 2 and the interfacial tension values were again measured. The results of this testing are given in Table V. As can be seen, the increase in pH to 9.0 caused a slight increase in interfacial tension. However, this increase is not outside a range acceptable for use in commercial enhanced oil recovery applications.

TABLE V

| | Interfacial Tensions (dynes/cm) with 3% Surfactant Concentrations in Various Alkaline PH's | | | |
|---|---|---|---|---|
| Surfactant | 3.4 | 9.0 | 10.5 | 12.0 |
| Example 2 | 0.347 | 0.478 | 0.407 | 0.370 |

What is claimed is:

1. A process for preparing a polyalkoxylated glucoside composition of the formula

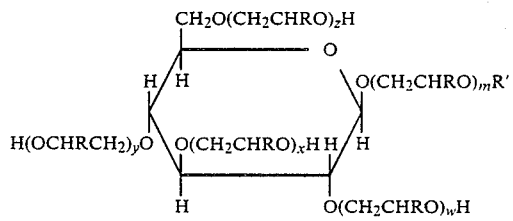

wherein each R is individually selected from the group consisting of a hydrogen and a methyl group; wherein the sum of $w+x+y+z$ is from about 4 to about 40; and wherein m is from about 2 to about 15; and wherein R' is selected from the group consisting of an alkyl group having about 6 to about 20 carbon atoms, and alkenyl group having about 6 to about 20 carbon atoms and an alkyl aryl group having about 10 to about 20 carbon atoms; said process comprising reacting in the presence of an effective catalytic amount of acid catalyst at a temperature from about 100° C. to about 150° C. a polyalkoxylated lower alkyl glucoside of the formula

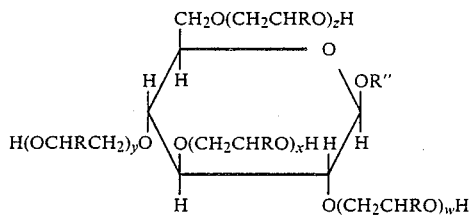

wherein R, w, x, y and z are as defined above and R" is a lower alkyl group having 1 to 4 carbon atoms with a polyalkoxylated alcohol of the formula

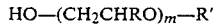

wherein R and R' are as defined above.

2. The process of claim 1 wherein each R is hydrogen and the sum of $w+x+y+z$ is from about 10 to about 20.

3. The process of claim 1 wherein m is from about 2 to about 10 and R' is an alkyl group having from about 8 to about 13 carbon atoms.

4. The process of claim 1 wherein m is from about 5 to about 10 and R' is an alkyl aryl group having from about 14 to about 18 carbon atoms.

5. The process of claim 1 wherein the acid catalyst is protic or Lewis acid catalyst.

6. The process of claim 5 wherein the catalyst is boron trifluoride etherate.

7. A polyalkoxylated glucoside composition comprising the formula

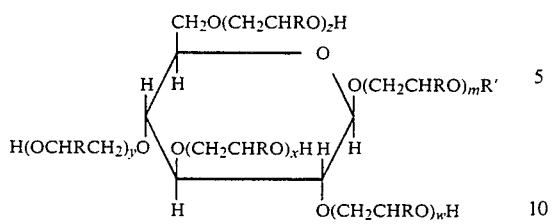

wherein each R is individually selected from the group consisting of a hydrogen and a methyl group; wherein the sum of $w+x+y+z$ is from about 4 to about 40; wherein m is from 2 to about 15; and R' is selected from the group consisting of an alkyl group having about 6 to about 20 carbon atoms, an alkenyl group having about 6 to about 20 carbon atoms and an alkyl aryl group having about 10 to about 20 carbon atoms.

8. The composition of claim 7 wherein each R is hydrogen and the sum of $w+x+y+z$ is from about 10 to about 20.

9. The composition of claim 7 wherein m is from about 2 to about 10 and R' is an alkyl group having from about 8 to about 13 carbon atoms.

10. The composition of claim 7 wherein m is from about 5 to about 10 and R' is an alkyl aryl group having from about 14 to about 18 carbon atoms.

11. A process for recovering hydrocarbons from a subterranean hydrocarbon-bearing formation penetrated by at least one injection well and at least one production well which comprises
(1) injecting into the formation via an injection well a drive fluid comprising water having dissolved therein from about 0.05 to about 6.0 weight percent of a surfactant composition comprising

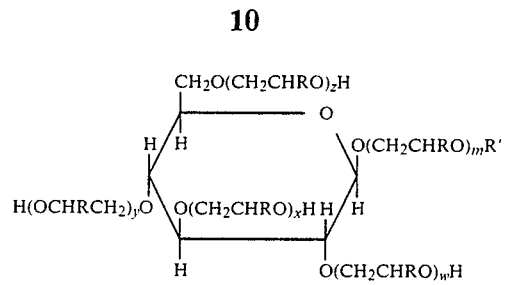

wherein each R is individually selected from the group consisting of a hydrogen and a methyl group; wherein the sum of $w+x+y+z$ is from about 4 to about 40; and wherein m is from about 2 to about 15; and wherein R' is selected from the group consisting of an alkyl group having about 6 to about 20 carbon atoms, an alkenyl group having about 6 to about 20 carbon atoms and an alkyl aryl group having about 10 to about 20 carbon atoms.

12. An aqueous drive fluid composition useful for recovering hydrocarbons from a subterranean hydrocarbon-bearing formation comprising
water having from about 0.05 to about 6.0 weight percent of a surfactant blend comprising:

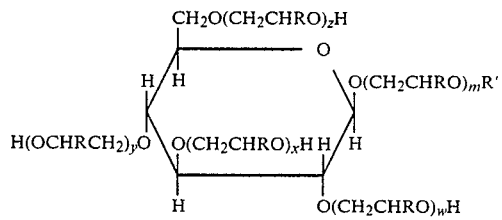

wherein each R is individually selected from the group consisting of a hydrogen and a methyl group; wherein the sum of $w+x+y+z$ is from about 4 to about 40; and wherein m is from about 2 to about 15; and wherein R' is selected from the group consisting of an alkyl group having about 6 to about 20 carbon atoms, an alkenyl group having about 6 to about 20 carbon atoms and an alkyl aryl group having about 10 to about 20 carbon atoms.

* * * * *